United States Patent
Roxbergh

(10) Patent No.: US 6,553,016 B1
(45) Date of Patent: Apr. 22, 2003

(54) DOWNLINK POWER CONTROL AT SOFT HANDOVER

(75) Inventor: Jan Roxbergh, Sollentuna (SE)

(73) Assignee: Telfonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/466,916

(22) Filed: Dec. 20, 1999

(51) Int. Cl.[7] ............... H04Q 7/00; H04Q 7/20
(52) U.S. Cl. ............ 370/331; 370/332; 455/442; 455/552
(58) Field of Search ............... 370/331–334; 455/436–442, 69, 70, 522, 67.1, 59, 60, 101, 272, 524, 525; 375/347, 312, 267

(56) References Cited

U.S. PATENT DOCUMENTS

| | | | |
|---|---|---|---|
| 5,345,598 A | 9/1994 | Dent | 455/522 |
| 5,367,533 A | 11/1994 | Schilling | 370/342 |
| 5,539,728 A | 7/1996 | Gaiani et al. | 455/522 |
| 5,548,812 A | 8/1996 | Padovani et al. | 455/442 |
| 5,551,057 A | 8/1996 | Mitra | 455/522 |
| 5,574,983 A | 11/1996 | Douzono et al. | 455/69 |
| 5,594,946 A * | 1/1997 | Menich et al. | 455/522 |
| 5,678,208 A | 10/1997 | Kowalewski et al. | 455/115 |
| 5,771,451 A | 6/1998 | Takai et al. | 455/442 |
| 5,781,861 A * | 7/1998 | Kang et al. | 455/442 |
| 5,822,699 A * | 10/1998 | Kotzin et al. | 455/447 |
| 5,878,350 A * | 3/1999 | Nakamura et al. | 455/442 |
| 6,128,506 A * | 10/2000 | Knutsson et al. | 455/522 |
| 6,144,861 A * | 11/2000 | Sundelin et al. | 455/522 |

FOREIGN PATENT DOCUMENTS

| | | |
|---|---|---|
| EP | 0 680 160 A2 * | 11/1995 |
| EP | 0 822 672 | 2/1998 |
| WO | 98/56200 | 12/1998 |
| WO | 98/59433 | 12/1998 |

* cited by examiner

*Primary Examiner*—Tracy Legree
(74) *Attorney, Agent, or Firm*—Nixon & Vanderhye, PC

(57) ABSTRACT

Method and apparatus are described for controlling base station transmit power (downlink) to a mobile station during soft diversity handover. The present invention adjusts downlink power of the ratio between downlink transmit powers of all of the involved base stations is equal to the received signal strengths from the mobile stations at each of the involved base stations.

22 Claims, 6 Drawing Sheets

DOWNLINK POWER CONTROL AT SOFT HANDOVER

FIELD OF THE INVENTION

The present invention relates to cellular telephone systems, and particularly to base station transmit power control during mobile radio handover in a code division multiple access cellular telephone system.

BACKGROUND AND SUMMARY OF THE INVENTION

It is well-known that cellular communications system include base stations arranged geographically in a cellular structure to allow mobile radio stations to communicate with one another and with associated switching systems. Communications occur through the base stations connected in groups to a switching node. The switching node communicates through a gateway to other communications systems.

In a Code Division Multiple Access (CDMA) mobile communications system, mobile radios can communicate with a common base station using the same radio frequency band because each mobile station employs a different modulation code that distinguishes its communications from those of other mobile radios. In addition, spread spectrum communications permit mobile radio transmissions to be simultaneously processed by more than one base station. This gives rise to diversity handovers in which a mobile radio is handed over from one base station to a second base station, all the while maintaining communication with a third base station. The constant communication into the third base station (usually combined with the communication from either the first or second base station) during handover between the first and second insures handover operation without any perceptible disturbance in the voice or data communications. During diversity handover, signals from the active base stations are combined in a common point with decisions being made on the "quality" of the received data. Typically, though not necessarily, this common point is located at the switching node connected to the base stations. At the mobile station, signals from the active base stations are combined.

In soft handover, if a mobile station travels to the edge of an active cell, an adjacent cell's base station assigns a transceiver to the call while the active base station continues to handle the call. At that point, both the active and the adjacent cell base stations handle the call until a make-before-break condition occurs. Thus, in a soft diversity handover, both base stations handle the call until the mobile station moves sufficiently close to one of the base stations which then exclusively handles the call.

Unfortunately, interference caused by a mobile station's communication to a common base station can be problematic. Mobile radios which are very close to a common base station transmit information to the base station using the same frequency band at the same time as mobile radios that may be further away. Other factors (such as environmental factors, etc.) may also affect signal strength disparities between multiple mobile radios communicating with a common base station. As a result, some mobile radio communications with a communication base station having the potential to dominate others on the same radio frequency band.

Further, if the transmission power level is the same from all base stations in a soft handover, then the same TPC command is sent towards all base stations involved in the soft handover. Due to errors in the received TPC commands (the TPC commands have no extra coding to protect them from transmission errors) the transmitted power level at each base station can drift even if they were set equal from the beginning.

In an ideal system, each mobile radio sends signals to a common base station at a power level that ensures all of the different mobile-transmitted signals arrive at the base station with about the same average power. Because the environment of the mobile station, the proximity of the mobile stations, etc. are changing, power levels for all radios is vigilantly controlled. As it turns out then, uplink (or reverse) transmit power control (TPC) from the mobile station to the base station is a significant factor in improving the performance and capacity of a CDMA system. Several methods are known for controlling uplink power including control based on a signal-to-noise ratio (or other suitable measure) of signals received from a base station (open loop transmit power control). Another method is for the base station to send transmit power control messages to the mobile station (closed loop power control) based on comparative signal strength received at the base station.

Downlink (or forward) transmit power control is also controlled. In downlink control, the base station varies its transmit power relying in part on power control commands sent by a mobile station to the base station. This procedure allows the mobile radio to ensure its receipt of good quality, non-interfering signals from the base station. For example if base station transmission power is too high (or unnecessarily high), the transmission may interfere with other communications with other radios. On the other hand, if base station power is too low (to minimize interference) the mobile station may receive too poor a quality of signal. Download control balances those issues.

Many different protocols for downlink power control are known. U.S. Pat. No. 5,345,598 (commonly assigned), for example, describes a single control loop for downlink and uplink power control.

The present invention addresses downlink power control from the base station to the mobile station in the context of soft or softer handover. A conventional approach to downlink transmission power control is for all base stations involved in the soft handover to transmit to the mobile station at the same downlink transmission power level. However, this results in increased interference levels which ultimately reduce the capacity of the system. Moreover, because of errors in the transmit power command ultimately received at each base station involved in the soft handover, the transmit power level at each base station can "drift" apart even though the transmitted power level was initially set to be equal for all of those base stations.

The present invention controls the downlink power level at one (or more) of the base stations involved in the soft handover so that the ratio between the downlink transmit powers from all of the involved base stations to the mobile station is equal to the ratio of the received signal strengths from the mobile stations at each of the involved base stations. Alternatively, the downlink power levels are controlled by a comparison based on the received signal strength to received interference for the connection to a specific mobile station. In the latter case, adjustments are made only on the downlink transmission power level to the specific mobile station.

These, as well as other objects and advantages of this invention, will be more completely understood and appreciated by careful study of the following more detailed description of a presently preferred exemplary embodiment of the invention taken in conjunction with the accompanying drawings, of which:

DETAILED DESCRIPTION OF THE PRESENTLY PREFERRED EMBODIMENTS

Figure 1:
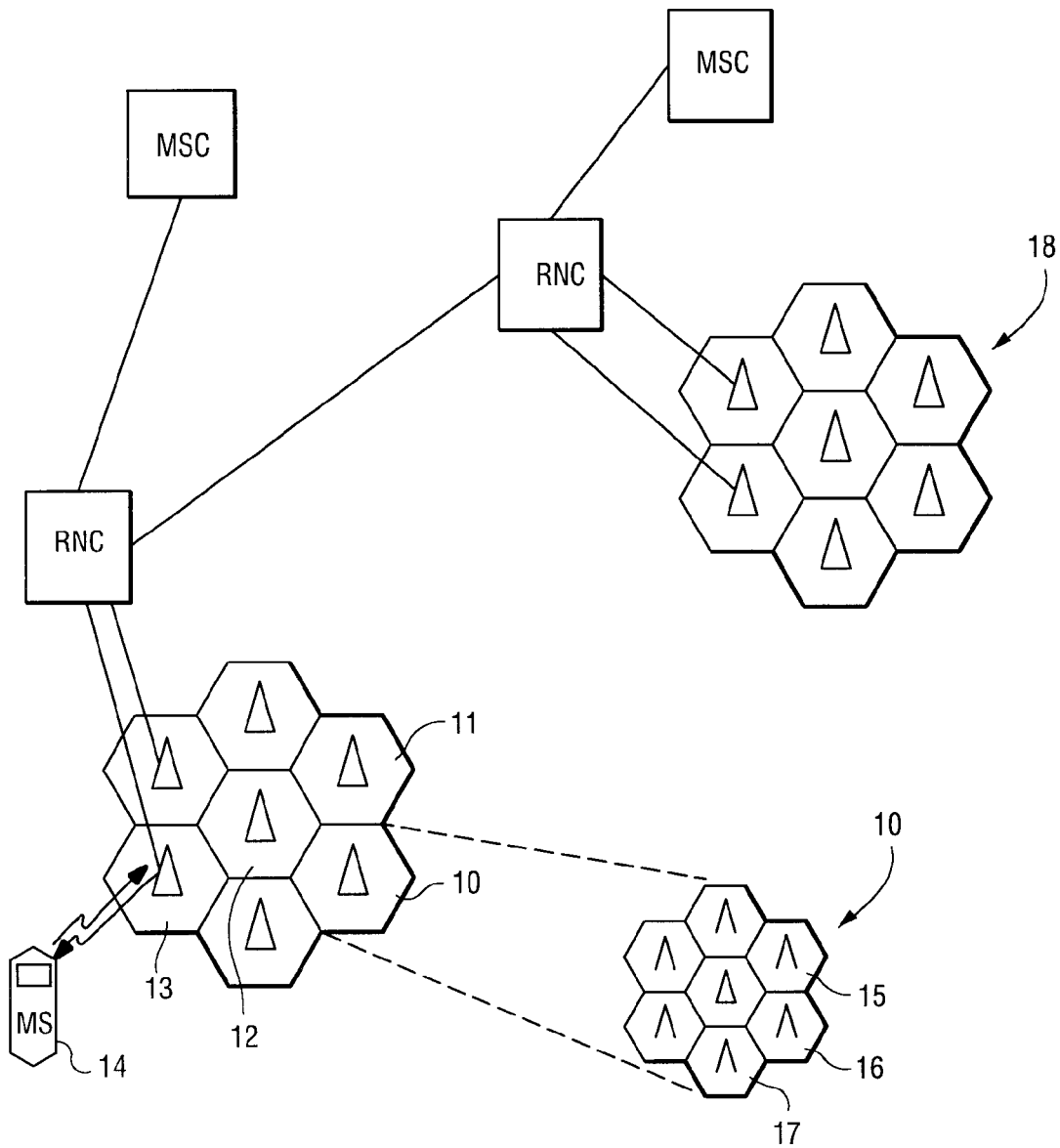
FIG. 1 is a schematic representation of a mobile phone cellular system.
Figure 2A:
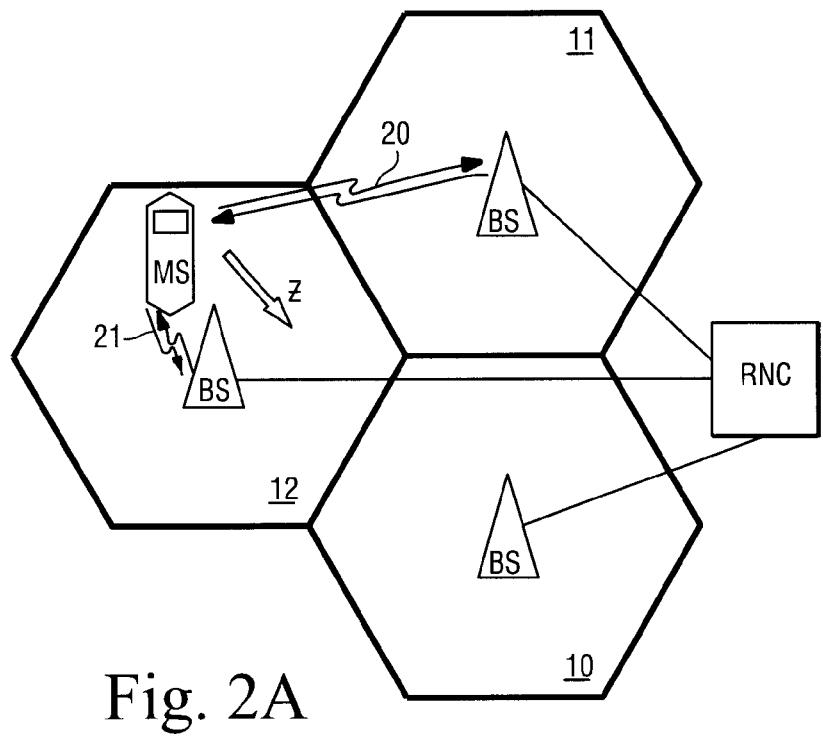
FIGS. 2A and 2B are schematic representations of a soft diversity handoff.
Figure 2B:
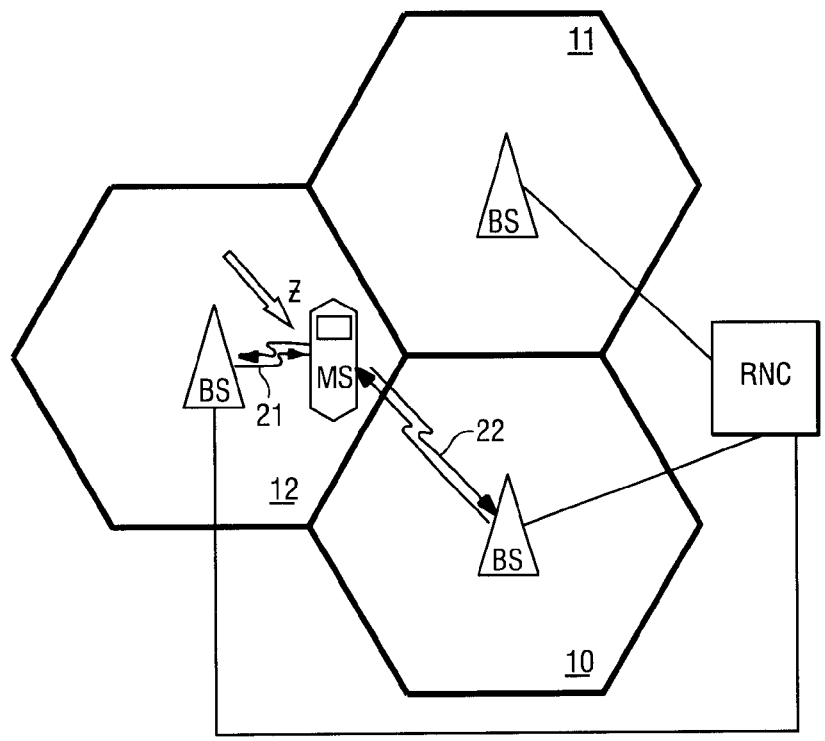

The present invention has particular application in soft diversity handover, an example of which is shown in FIGS. 1, 2A and 2B, and described below.

In FIG. 1, a mobile station MS communicates with a base station associated with a cell 13 in which the mobile station currently resides. The base station in cell 13 is part of a larger cellular network including such base stations as base stations 10, 11, 12, 13, etc. The base station 13 receives communications from the mobile station MS and passes them to the radio network core RNC associated with the base station 13. The radio network cores (RNC) communicate with each other through mobile services switching stations MSC in order to connect the mobile stations communications with those of other mobile stations, networks, etc. As a mobile station moves throughout the cellular geographic area, communications by the mobile station are handed off from one base station to another as it crosses cellular zones.

Further, the mobile station may be handed over within a cellular area 10, within smaller geographic areas, commonly known as sectors. The sectors may be defined as a result of, for example, directional antenna communications by a base station. In this way, a cell 10 may be divided into sectors 15, 16, 17, etc. The present invention finds particular application in soft diversity handovers in which a mobile station moves from one cell 10, 11, 12, 13, etc. to another cell. However, as one can see from FIG. 1, the present invention can find equal application in softer diversity handovers in which a mobile station is handed from one sector 15, 16, 17, etc. to another within a cell 10.

FIGS. 2A and 2B illustrate a soft diversity handoff. FIG. 2A illustrates the communications conditions of the mobile station MS just before diversity handoff, and FIG. 2B illustrates the same mobile station MS just after diversity handoff.

In FIG. 2A, the mobile station is located in cell 12 and is moving in the direction of the arrow Z. In diversity communications, the mobile station MS communicates simultaneously with two base stations in two different cells. In this case, the mobile station MS has communications 21 established with the base station in cell 12 and additional communications 20 established with the base station in cell 11. The base stations, in turn, communicate with the radio network core which passes communications received from other radio network cores to the mobile station MS via the diversity base stations in cells 11 and 12.

In FIG. 2B, the mobile station MS has moved across position Z to a position closer to the border of cell 10. As a result of known techniques for determining when a diversity handoff should occur, the mobile station communications 20 with the base station in cell 11 are severed and communications 22 with the base station cell 10 are established. Thus, in FIG. 2B, the mobile station is simultaneously communicating with the base station of cells 12 and 10 whereas in FIG. 2A, the mobile station was simultaneously communicating with the base stations in cells 12 and 11. In either case, the mobile station is always in simultaneous communication with at least two base stations of two different cells even though it is sometimes being handed over from one of the base stations to a new base station.

Figure 3:
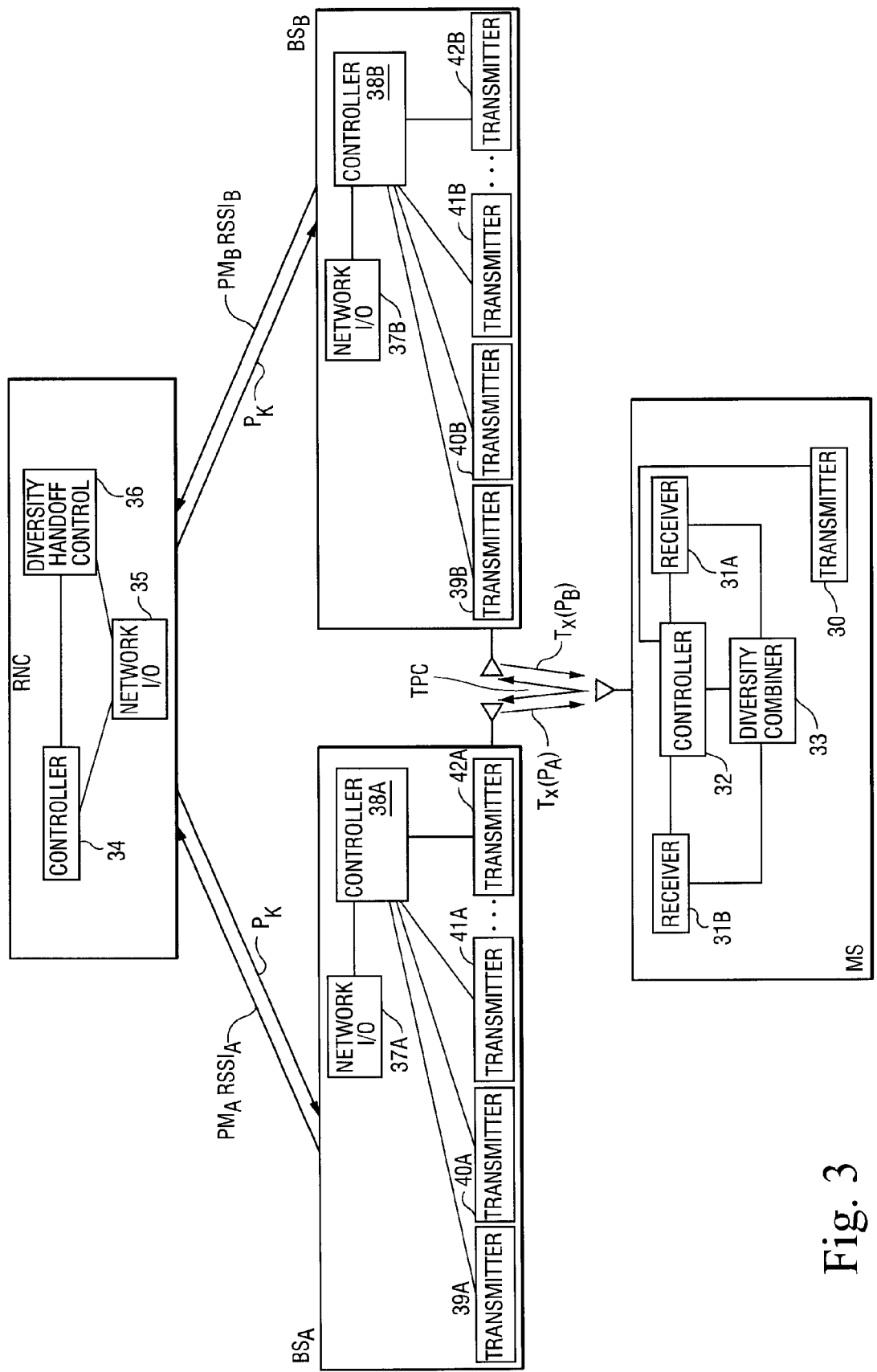
FIG. 3 is a schematic representation of the network, base station, and mobile station structures.

As described above, as the mobile station is handed over in a soft or softer diversity handoff, it is quite important to control power levels in the downlink to ensure that unacceptable levels of interference are not encountered. The power signals and power control signals associated with a mobile station communicating with two base stations is shown with respect to the structure of FIG. 3. There, two base stations, $BS_A$ and $BS_B$, communicate with a radio network core RNC in order to pass communications to the mobile station MS. The mobile station MS includes a transmitter 30 and two receivers, 31A and 31B, coupled to a controller 32 and a diversity combiner 33. In known manner, the receivers 31A and 31B receive simultaneous communications from the base stations $BS_A$ and $BS_B$ and combine the received signals in the diversity combiner 33 under the operation of the controller 32. The base stations $BS_A$ and $BS_B$ include network input/output ports 37A and 37B which communicate with network I/O ports 35 of the radio network core RNC. The base stations also include controllers 38A and 38B which control the operation of multiple transmitters 39A, 39B, 40A, 40B, 41A, 41B, 42A, and 42B, etc. Although four transmitters are shown in each of the base stations $BS_A$ and $BS_B$, the ellipses shown in FIG. 3 are intended to indicate that more or less transmitters may be employed per base station. Further, as described above, the present invention may have application in softer diversity handovers in which the mobile station MS is communicating within multiple sectors of one base station transmitter. The radio network core RNC also includes controller 34 and diversity handoff control 36, which supervises the diversity handover of a mobile station MS, as described above and shown with respect to FIGS. 2A and 2B.

Returning to FIG. 3, the radio network core RNC communicates a power correction Power Correction Factor $P_K$ as needed to the base stations $BS_A$ and $BS_B$. The base stations $BS_A$ and $BS_B$ communicate a measured transmission power downlink $PM_A$ and $PM_B$ to the radio network core, as well as measured received signal strength indicators $RSSI_A$ and $RSSI_B$ to the radio network core RNC. Meanwhile, the mobile station MS communicates a transmission power command PPC to the base stations $BS_A$ and $BS_B$ in the uplink and receive from the base stations $BS_A$ and $BS_B$ a used transmission power downlink $T_X(P_A)$ and $T_X(P_B)$.

Figure 4:
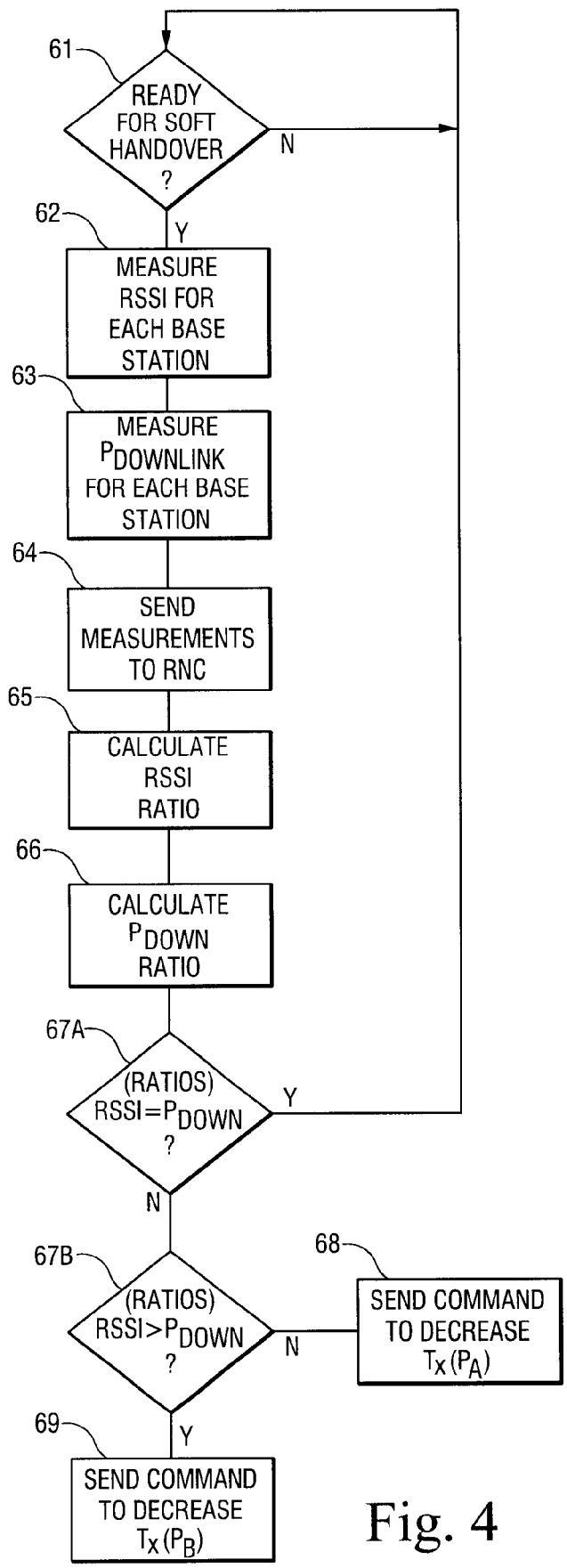
FIGS. 4 and 6 are flow chart representations of the power control steps in accordance with example embodiments of the present invention.

In the context of the communications identified in FIG. 3, the example embodiment of the present invention operates as shown in the flow chart of FIG. 4.

Specifically, once a diversity soft (or softer) handover is identified (step 61), the following procedure is performed on a frame-by-frame basis:

First each involved base station measures the average signal strength received (RSSI) on the uplink from the mobile station at step 62. $RSSI_A$ will be the signal strength during a frame on the uplink to base station A and $RSSI_B$ will be the signal strength during a frame on the uplink to base station B.

Then, at step 63, each involved base station measures the average of its power ($P_A$ or $P_B$) level for downlink transmissions ($T_X(P_A)$ or $T_X(P_B)$) to the mobile station.

Both of these measured values (RSSI and P) are sent to the radio network controller (RNC) at step 64. The RNC controls the base stations involved in the soft handover. Received pay load from the mobile station is included in this transmission to the RNC.

The RNC then calculates $RSSI_{ratio}=RSSI_A/RSSI_B$ at step 65 (assuming there to be only two base stations A and B involved in the soft handover). At step 66, the RNC calculates the downlink transmit power ratio $P_{DOWN}=P_A/P_B$. The goal of the invention is for $RSSI_{ratio}$ to equal $P_{DOWN}$ so, the RNC compares the ratio of the received signal strength and downlink transmit power for all of the base stations involved in the soft handover. If $RSSI_{ratio}=P_{DOWN}$ at step 67A, then the power goal is met and the routine returns to step 61 pending another handover. If, however, $RSSI_{ratio}$ is greater than $P_{DOWN}$ at step 67B, then the radio network controller sends a command to decrease the downlink transmit power from base station B to the mobile station at step 69. This has the effect of increasing $P_{DOWN}$ so that it moves closer to the value of $RSSI_{ratio}$. Alternatively, if $RSSI_{ratio}$ is less than $P_{DOWN}$ at step 67B, then the RNC sends a command to the base station A to decrease its transmit power to the mobile station at step 68. This has the effect of decreasing $P_{DOWN}$ so that it moves closer to the value of $RSSI_{ratio}$.

Alternatively, to commands 68 and 69, commands can be sent to increase the alternative base station or complementary increase/decrease commands can be sent to both base stations A and B. That is, for example, step 69 could be replaced with an increase in $T_X(P_A)$ or in complementary increase $T_X(P_A)$ and decrease $T_X(P_B)$ commands provided the relative effect is to decrease $T_X(P_B)$ relative to $T_X(P_A)$.

Figure 5A:
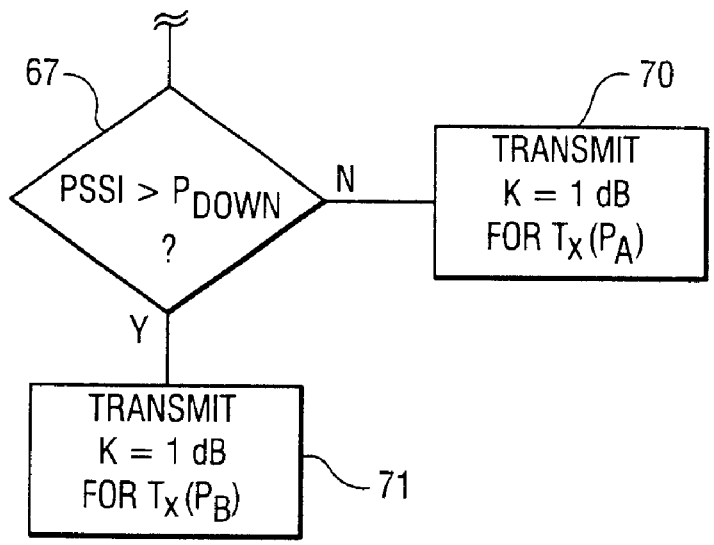
FIGS. 5A and 5B are schematic flow chart representations of further alternative embodiments of the present invention.
Figure 5B:
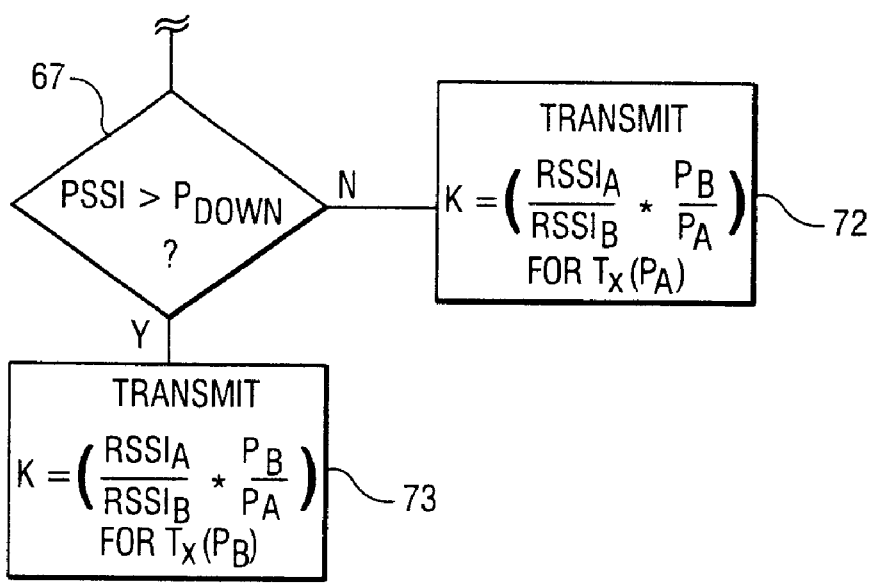

As shown in FIG. 5A, the commands following step 67 ($RSSI>P_{DOWN}$?) can be sent as a command to increase or decrease the transmit power level by a fixed amount "K", for example, 1 dB in steps 70–71. Alternatively and preferably, the change amount can be variably set using:

$$K=(RSSI_A/RSSI_B)*(P_B/P_A),$$

where K is the amount to decrease the base station transmit power, as shown in steps 72 and 73 of FIG. 5B.

The present invention has equal application in softer handovers (i.e., between sections of a common base station).

An alternative embodiment to the above-described algorithm is now described.

If the received signal strength comparison is used, as suggested above, then the uplink and downlink handover points (the points were the quality is equal to or from the base stations involved) will drift apart if one of the base stations gets loaded with traffic. As an improvement in such a situation, the received signal strength to interference ratio can be used instead of the received signal strength. Depending on how the K factor is set, the uplink and downlink handover points can be more or less kept together. This occurs by moving the downlink handover point more or less towards the loaded cell. This will also reduce the desirability for absolute accuracy in the signal strength of the first-described example embodiment.

Figure 6:
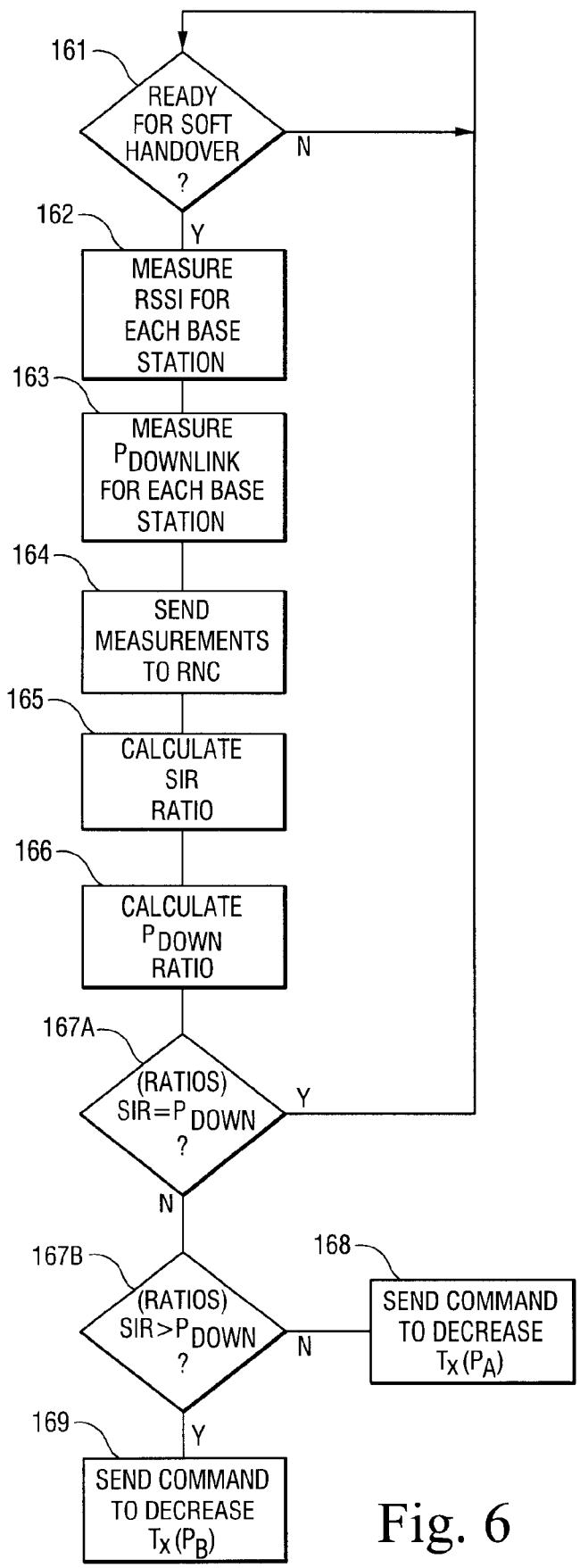

In that alternative example embodiment, the present invention operates as shown in the flow chart of FIG. 6.

Specifically, once a diversity soft (or softer) handover is identified (step 161), the following procedure is performed on a frame-by-frame basis:

First each involved base station measures the signal to interference ratio (SIR) on the uplink from the mobile station at step 162. $SIR_A$ will be the signal strength during a frame on the uplink to base station A and $SIR_B$ will be the signal strength during a frame on the uplink to base station B.

Then, at step 163, each involved base station measures the average of its power ($P_A$ or $P_B$) level for downlink transmissions ($T_X(P_A)$ or $T_X(P_B)$) to the mobile station.

Both of these measured values (SIR and P) are sent to the radio network controller (RNC) at step 164. The RNC controls the base stations involved in the soft handover. Received pay load from the mobile station is included in this transmission to the RNC.

The RNC then calculates $SIR_{ratio}=SIR_A/SIR_B$ at step 165 (assuming there to be only two base stations A and B involved in the soft handover). At step 166, the RNC calculates the downlink transmit power ratio $P_{DOWN}=P_A/P_B$. The goal of the invention is for $SIR_{ratio}$ to equal $P_{DOWN}$ so, the RNC compares the ratio of the signal strength and downlink transmit power for all of the base stations involved in the soft handover. If $SIR_{ratio}=P_{DOWN}$ at step 167A, then the power goal is met and the routine returns to step 161 pending another handover. If, however, $SIR_{ratio}$ is greater than $P_{DOWN}$ at step 167B, then the radio network controller sends a command to decrease the downlink transmit power from base station B to the mobile station at step 169. This has the effect of increasing $P_{DOWN}$ so that it moves closer to the value of $SIR_{ratio}$. Alternatively, if $SIR_{ratio}$ is less than $P_{DOWN}$ at step 167B, then the RNC sends a command to the base station A to decrease its transmit power to the mobile station at step 168. This has the effect of decreasing $P_{DOWN}$ so that it moves closer to the value of $SIR_{ratio}$.

Alternatively, to commands 168 and 169, commands can be sent to increase the alternative base station or complementary increase/decrease commands can be sent to both base stations A and B. That is, for example, step 169 could be replaced with an increase in $T_X(P_A)$ or in complementary increase $T_X(P_A)$ and decrease $T_X(P_B)$ commands provided the relative effect is to decrease $T_X(P_B)$ relative to $T_X(P_A)$.

The commands following step 167 can be similar to those shown in FIGS. 5A and 5B, with RSSI being replaced by SIR.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling transmission power from first and second base stations involved in a soft diversity handover of a mobile radio, comprising the steps of:

measuring an uplink signal strength received by the first base station from the mobile station;

measuring a corresponding uplink signal strength received by the second base station from the mobile station;

measuring a power level for downlink transmissions from the first base station to the mobile station;

measuring a power level for downlink transmissions from the second base station to the mobile station;

calculating an uplink signal strength ratio equal to the measured uplink signal strength received by the first base station divided by the uplink signal strength received by the second base station;

calculating a downlink power level ratio equal to the measured power level for downlink transmissions from the first base station divided by the measured power level for downlink transmissions from the second base station;

comparing the uplink signal strength ratio to the downlink power level ratio; and if the uplink signal strength ratio substantially equals the downlink power level ratio, then handing over the mobile radio without adjusting the downlink power levels of the first or second base station;

if the uplink signal strength ratio is greater than the downlink power level ratio, then handing over the mobile radio after reducing the downlink power from the second base station relative to the downlink power from the first base station; and if the uplink signal strength ratio is less than the downlink power level ratio, then handing over the mobile radio after increasing downlink power from the second base station relative to the downlink power from the first base station.

2. A method according to claim 1, wherein:
the step of handing over the mobile radio after reducing the downlink power from the second base station relative to the downlink power from the first base station includes the step of:
transmitting a command to the second base station to reduce power by a predefined first amount.

3. A method according to claim 2, wherein the predefined first amount is a fixed incremental amount.

4. A method according to claim 2, wherein the predefined first amount is an amount k determined by the equation:

$$k = \text{(uplink signal strength ratio)}/\text{(downlink power level ratio)}.$$

5. A method according to claim 2, wherein:
the step of handing over the mobile radio after increasing the downlink power from the second base station relative to the downlink power from the first base station includes the step of:
transmitting a command to the second base station to increase power by a predefined second amount.

6. A method according to claim 5, wherein the predefined second amount is a fixed incremental amount.

7. A method according to claim 5, wherein the predefined amount is an amount k determined by the equation:

$$k = \text{(uplink signal strength ratio)}/\text{(downlink power level ratio)}.$$

8. A method according to claim 1, wherein:
the step of handing over the mobile radio after reducing the downlink power from the second base station relative to the downlink power from the first base station includes the step of:
transmitting a command to the first base station to increase power by a predefined first amount.

9. A method according to claim 8, wherein the predefined first amount is a fixed incremental amount.

10. A method according to claim 8, wherein the predefined first amount is an amount k determined by the equation:

$$k = \text{(uplink signal strength ratio)}/\text{(downlink power level ratio)}.$$

11. A method according to claim 8, wherein:
the step of handing over the mobile radio after increasing the downlink power from the second base station relative to the downlink power from the first base station includes the step of:
transmitting a command to the second base station to increase power by a predefined second amount.

12. A method according to claim 11, wherein the predefined second amount is a fixed incremental amount.

13. A method according to claim 11, wherein the predefined amount is an amount k determined by the equation:

$$k = \text{(uplink signal strength ratio)}/\text{(downlink power level ratio)}.$$

14. A method according to claim 1, wherein:
the step of handing over the mobile radio after reducing the downlink power from the second base station relative to the downlink power from the first base station includes the step of:
transmitting a command to the first base station to increase power by a predefined first amount K1 and transmitting a command to the second base station to decrease power by a predefined second amount K2.

15. A method according to claim 14, wherein K1 and K2 satisfy the equation:

$$K1/K2 = \text{(uplink signal strength ratio)}/\text{(downlink power level ratio)}.$$

16. A method according to claim 1, wherein:
the step of handing over the mobile radio after increasing the downlink power from the second base station relative to the downlink power from the first base station includes the step of:
transmitting a command to the first base station to decrease power by a predefined first amount K1 and transmitting a command to the second base station to increase power by a predefined second amount K2.

17. A method according to claim 16, wherein K1 and K2 satisfy the equation:

$$K2/K1 = \text{(uplink signal strength ratio)}/\text{(downlink power level ratio)}.$$

18. A cellular radio network, comprising:
a first base station to communicate with a mobile station and to measure an uplink signal strength received by the first base station from the mobile station;

a second base station to communicate with the mobile station and to measure a corresponding uplink signal strength received by the second base station from the mobile station;

a mobile radio in simultaneous diversity communication with plural base stations and to measure a power level for downlink transmissions from the first base station to the mobile station and a power level for downlink transmissions from the second base station to the mobile station; and a radio network core to receive 1) the uplink signal strength received by the first base station from the mobile station, 2) the corresponding uplink signal strength received by the second base station from the mobile station, 3) the power level for downlink transmissions from the first base station to the mobile station, and 4) the power level for downlink transmissions from the second base station to the mobile station, to calculate 1) an uplink signal strength ratio equal to the measured uplink signal strength received by the first base station divided by the uplink signal strength received by the second base station and 2) a downlink power level ratio equal to the measured power level for downlink transmissions from the first base station divided by the measured power level for downlink transmissions from the second base station, and to compare the uplink signal strength ratio to the downlink power level ratio; wherein:
if the uplink signal strength ratio substantially equals the downlink power level ratio, then the radio network core adapted to handover the mobile radio without adjusting the downlink power levels of the first or second base station;
if the uplink signal strength ratio is greater than the downlink power level ratio, then the radio network core adapted to handover the mobile radio after reducing the downlink power from the second base station relative to the downlink power from the first base station; and
if the uplink signal strength ratio is less than the downlink power level ratio, then the radio network core adapted to handover the mobile radio after increasing downlink power from the second base station relative to the downlink power from the first base station.

19. A method of controlling transmission power from first and second base stations involved in a soft diversity handover of a mobile radio, comprising the steps of:
determining an uplink signal strength to interference ratio between the first base station and the mobile station;
determining a corresponding uplink signal strength to interference ratio between the second base station and the mobile station;
measuring a power level for downlink transmissions from the first base station to the mobile station;
measuring a power level for downlink transmissions from the second base station to the mobile station;
calculating an uplink signal strength ratio equal to the measured uplink signal strength to interference ratio at the first base station divided by the uplink signal strength to interference ratio at the second base station;
calculating a downlink power level ratio equal to the measured power level for downlink transmissions from the first base station divided by the measured power level for downlink transmissions from the second base station;
comparing the uplink signal strength ratio to the downlink power level ratio; and
if the uplink signal strength ratio substantially equals the downlink power level ratio, then handing over the mobile radio without adjusting the downlink power levels of the first or second base station;
if the uplink signal strength ratio is greater than the downlink power level ratio, then handing over the mobile radio after reducing the downlink power from the second base station relative to the downlink power from the first base station; and
if the uplink signal strength ratio is less than the downlink power level ratio, then handing over the mobile radio after increasing downlink power from the second base station relative to the downlink power from the first base station.

20. A method according to claim 19, wherein:
the step of handing over the mobile radio after reducing the downlink power from the second base station relative to the downlink power from the first base station includes the step of:
transmitting a command to the second base station to reduce power by a predefined first amount.

21. A method according to claim 20, wherein the predefined first amount is a fixed incremental amount.

22. A method according to claim 20, wherein the predefined first amount is an amount k determined by the equation:

$$k = (\text{uplink signal strength ratio})/(\text{downlink power level ratio}).$$

* * * * *